May 17, 1966  M. L. MILLER ETAL  3,251,573
CONTROL VALVE

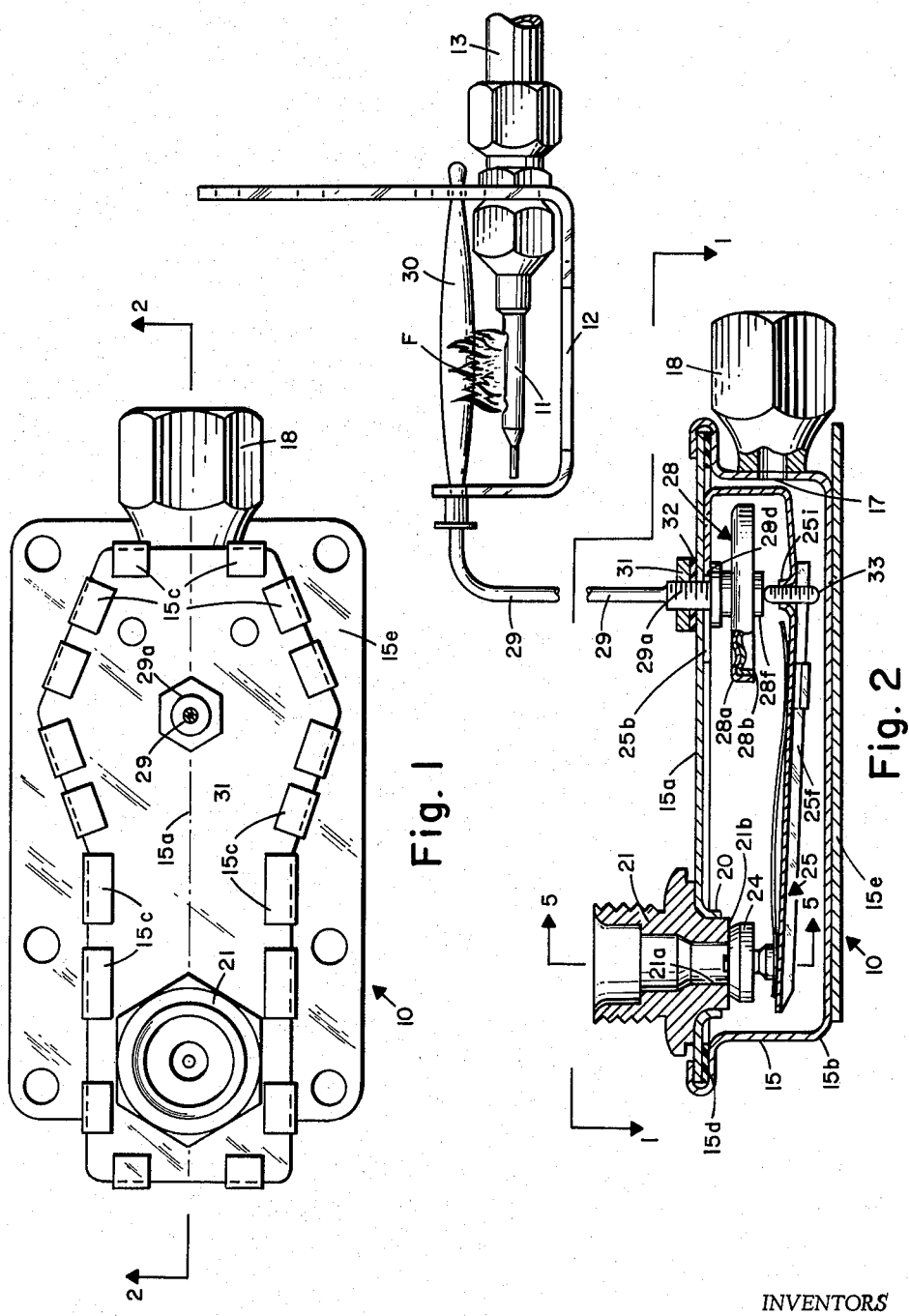

Filed March 12, 1963  2 Sheets-Sheet 2

INVENTORS
JOHN H. CANTLIN
MARSDEN L. MILLER
BY

ATTORNEY

United States Patent Office 3,251,573
Patented May 17, 1966

3,251,573
CONTROL VALVE
Marsden L. Miller, Springfield, and John H. Cantlin, Short Hills, N.J., assignors to The Wilcolator Company, Elizabeth, N.J., a corporation of Delaware
Filed Mar. 12, 1963, Ser. No. 264,633
3 Claims. (Cl. 251—78)

The present invention relates to an improved thermostatically operated fluid snap action valve particularly suitable for controlling the flow of fuel gas to a burner ignited by a pilot flame to automatically shut down the supply of fuel to the burner in the event the ignition flame becomes extinguished.

The principal object of the invention is the provision of an inexpensive, durable snap acting on-off valve for controlling flow of fluid, such as fuel gas, in accordance with a condition responsive power element having a relatively short and slow movement, such as a thermally responsive expansible element. In carrying out the invention a housing is provided having a fluid passageway therethrough including an outlet valve seat on which a poppet type valve member seats to close the flow of fluid through the housing. The valve closing member is carried by a pivoted arm which swings according to movement of the power element, the valve member being connected with the arm through a spring member which normally urges the valve member toward the arm and the flexibility of which permits lateral movement of the valve member from the arm to quickly close on the valve seat as the valve member approaches the seat so as to be acted upon by the reduction in pressure on the seating side of the valve member arising from the reduction in flow area between the valve member and outlet. A lost most connection means is also provided between the arm and valve member for causing the arm to act directly on the member to positively move it from its seat closing position whereupon the resulting reduction in static pressure on the valve permits the spring to snap move the valve member toward the arm and provide a quick substantial opening movement to the valve.

A further object of the invention is the provision of a control valve of the type mentioned in which the arm is formed of sheet metal having one end rigidly secured to the valve housing and having a weakened portion adjacent the secured end for causing the arm to flex at this point and follow the movements of a power element engaging the arm adjacent this point, and the spring carrying the valve member comprising a cantilever type mounted spring attached at one end to the arm adjacent to the flexure point thereof and having the opposite end, to which the valve member is attached, connected to the arm by a lost motion connection, the arm being rigid relative to the spring strip along the portion coextensive with the spring.

Other objects and advantages of the invention will be apparent from the following description of a preferred embodiment thereof, reference being made to the accompanying drawings, wherein, FIG. 1 is a top elevational view of a safety control valve for a gas burner ignited by a pilot flame, the view being taken along line 1—1 of FIG. 2;

FIG. 2 is a sectional view taken substantially along line 2—2 of FIG. 1;

Figures 5, 6:
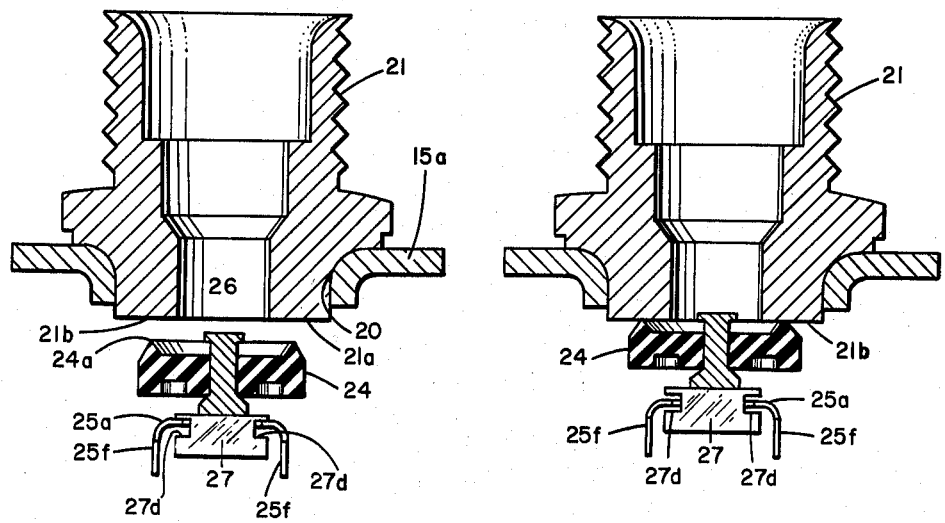
FIGS. 5 and 6 are fragmentary sectional views taken substantially along line 5—5 of FIG. 2, showing the valve respectively in its open position and in a closed position with certain parts moving toward the valve opening position.
Figure 3:
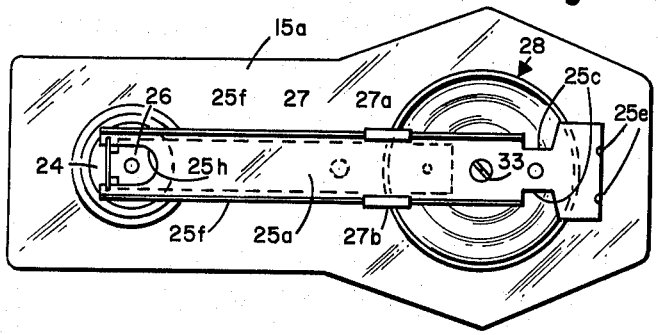
FIG. 3 is a plan view in elevation of the control valve having a portion of the housing removed.

Referring to the drawings, a control valve embodying the invention is shown at 10 and is utilized to control the flow of fuel gas to a burner, not shown, which is ignited by a pilot flame F normally burning at a pilot burner 11 supported on a bracket 12 adjacent to the burner, the pilot gas being supplied through pipe 13 from a suitable source. The purpose of valve 10 is to close off the supply of gas to the burner in the event flame F becomes extinguished and to open the valve promptly upon the reestablishment of the flame.

In the form of the invention shown, the control valve comprises a housing formed by a flat plate 15a and a concave cover 15b, preferably formed by a sheet metal stamping, crimped thereto by tabs 15c formed on the cover and turned over the edges of the plate. Preferably, a suitable gasket 15d is interposed between the plate and cover to form a gas tight joint. A mounting plate 15e is welded to cover 15b and has openings by which the valve can be bolted to a suitable support, not shown.

The right hand end of cover 15b, as viewed in the drawings, has an inlet opening 17 and a threaded coupling 18 is welded in the opening to provide for conventional connection to a gas supply main, pipe or tubing, not shown. Plate 15a has an extruded outlet opening 20 formed therein adjacent the left hand end, and a threaded coupling 21 is welded in the opening to receive a fitting for attaching a pipe or tubing, not shown, to the valve housing, the pipe leading to the burner to be controlled by the valve. Coupling 21 has a bored neck portion 21a which is received within the extruded walls of opening 20 formed through plate 15a and forms a ported valve seat 21b. Valve seat 21b is closed by a disc or poppet type valve member 24 which is carried by an arm assembly indicated generally at 25.

Valve member 24 is preferably formed of a suitable plastic material having a bevelled rim 24a formed thereabout which engages valve seat 21b to tightly close off the flow of gas through the port of the seat. The valve member is supported on a post 26 extending snugly through a central opening therein so as to prevent leakage of gas between the post and walls of the central opening and the post is riveted to the arm assembly 25, described more fully hereinafter.

Figure 4:
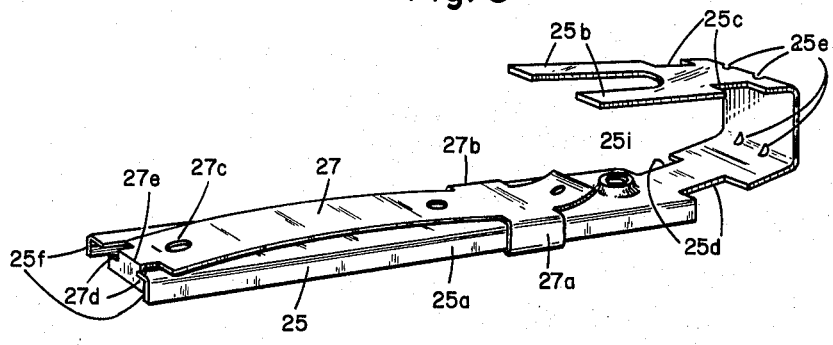
FIG. 4 is a perspective view of an arm assembly of the valve shown on a larger scale than in the preceding figures.

The arm assembly 25 comprises a relatively rigid arm 25a and a relatively flexible cantilever type spring 27. Arm 25a is preferably formed of a resilient metal spring having a fork formation 25b at one end, as seen in FIG. 4, by which the end is anchored to plate 15a in a manner disclosed presently. The portion of arm 25a toward the forked end is reversely bent to extend the arm to a point opposite valve seat 21b. The areas of the strip adjacent the reversed sections are notched on opposite sides thereof at 25c and 25d and the bent portions are stiffened by rib forming indentations 25e thereby establishing a point of flexure at the notched areas. The edge portions 25f of arm 25a are turned downwardly, as viewed in FIGS. 2 and 4, to provide stiffening flanges to that portion of the strip to the left of notched portions 25d.

Valve member 24 is attached directly to spring 27 and is lightly urged by the spring toward arm 25a so that it may be withdrawn from the arm by the action of gas entering the outlet port of seat 21b as the member is bought in proximity to the valve seat, which is explained more fully hereinafter.

Spring 27 comprises a relatively thin flexible spring strip which is tightly attached at one end to arm 25a by crimping laterally projecting lugs 27a and 27b formed thereon about the flanges 25f and extends cantilever fashion along the top side of the arm, as seen in FIGS. 2 and 4, and is biased to lightly urge its left hand end to arm 25a. Post 26 forming a part of valve member 24 is staked to the spring by a necked portion extending through an opening 27c in the spring and rolled against the edges of the opening.

The valve member carrying end of spring 27 has a lost motion connection with the adjacent end portion of arm 25a, which connection comprises spaced shoulders 27d formed by cutting two rectangular notches in opposite sides of the strip and bending the strip downwardly along a line 27e at the notched portion. Arm 25a has a semi-circular recess 25h formed in the left hand end through which the downturned portion of spring 27 extends so that the spring proper engages the top surface of arm 25 when valve member 24 is in its open position, as seen in FIG. 5, and shoulders 27d are spaced from the underside of the arm. By this arrangement when valve 24 is maintained closed by the static gas pressure in the valve housing arm 25a may move from the valve closed position independently of the valve member until the underside of the arm engages the shoulders 27d.

Arm 25 is caused to swing in the valve opening and closing directions by following the expansion and contraction of a power element 28 which may be of any suitable construction, and in the form shown it comprises two dish shaped flexible metal discs 28a and 28b arranged in nesting relation with the outer edges welded together to form a relatively small volume fluid tight chamber between the discs. One end of a tube 29 is secured to the disc 28a by welding it to a threaded neck 29a in turn welded about an opening in the disc and the other end of the tube has a bulb 30 connected thereto to form communication between the chamber and bulb. The tube and bulb are filled with mercury and when the bulb is subject to the heat of a flame, the mercury therein vaporizes and the resulting increase in pressure causes expansion of the chamber by flexing of the discs 28a and 28b, and when the bulb is cooled the mercury recondenses therein and the discs retract.

Element 28 and arm 25a are secured to plate 15a by a nut 31 threaded on neck 29a and drawn against the upper surface of the plate. The forked portion 25b of arm 25a straddles the neck and is clamped between a collar 28d and the underside of the plate by the pressure of the nut drawing upwardly on the neck. Preferably, a gasket 32 is interposed between plate 15a and a nut 31 to prevent escape of gas about stem 29a.

As mentioned previously, arm 25a is of spring material and it is biased against disc 28b, the engagement being effected by an adjusting screw 33 threaded through an extruded opening 25i in the arm and abutting an abutment 28f integral with the disc. It will be seen, that when element 28 expands, arm 25a is moved downwardly and when the element collapses the arm moves upwardly, following the contracting movement of element 28. By adjusting screw 33, the position of the free end of the arm relative to the valve seat can be adjusted for proper operation of the valve mechanism according to the temperature responding element 28.

Bulb 30 is supported to be subject to the heat of flame F so that when this flame is established the mercury therein is vaporized causing expansion of element 28 and should the flame become extinguished for any reason the mercury in the bulb cools and condenses.

Normally, the movement of arm 25a by the power element 28 is relatively slow so that if valve member 24 were connected directly to the arm the increase or decrease in the rate of flow of gas through seat 21b to the burner by this slow action would be so gradual that a "flash back" or release of unburned gas would be apt to occur. It is desirable therefore that the gas to the burner be controlled by snap action so that only a volume of gas sufficient to support a stable flame is fed to the burner. In the present form of the invention this snap action is accomplished by supporting valve member 24 on spring 27 and providing the lost motion connection between the spring and arm 25a as described hereinbefore. Thus, assuming that flame F is extinguished for any reason, arm 25a gradually moves valve member 24 toward valve seat 21b with the valve moving with the arm as shown in FIG. 5, and as the valve approaches the seat but before a substantial reduction in flow of gas occurs, the decrease in the flow area across the valve seat causes a reduction in pressure on the seating side of the valve member resulting in a pressure differential which overcomes the tension of spring 27 and snaps the valve member to close on the seat, the valve member moving from the arm as seen in FIG. 6. The rate of spring 27 is such that its resistance to the seat closing movement of valve 24 does not appreciably increase and as the valve approaches the seat the pressure differential on opposite faces thereof progressively increases, causing a snap movement.

When the flame F is reignited, arm 25a is moved in a direction away from valve seat 21b by expansion of element 28 but this initial movement of the arm has no affect on valve member 24 due to the lost motion connection between the arm and valve, and the static pressure of the gas on the valve member retains it seated against the relatively slight valve opening pressure of spring 27. When arm 25a engages shoulders 27d, i.e. at the limit of the lost motion connection, the movement of the arm will then be directly imparted to valve member 24 and it will move against the static pressure in the housing and crack an opening in valve seat 21b which causes an immediate reduction in the pressure differential on opposite sides of the valve member so that the tension of spring 27 will then cause a snap movement to the arm 25a carrying the valve member substantially away from the valve seat, as shown in FIG. 5.

It will be seen that a snap movement is imparted to valve member 24 in both the opening and closing of the valve and that the structure by which this is accomplished is comprised of a minimum number of parts which may be economically fabricated from stampings of light weight material. It will also be observed that the power element and valve mechanism can be readily assembled on plate 25a after which cover 15 can be attached thereto to form the valve housing.

Although we have described but one form of the invention it is to be understood that other forms, modifications and adaptations could be made all falling within the scope of the claims which follow.

We claim:

1. A valve mechanism comprising, a plate having a valve port means thereon and a condition responsive power element attached thereto in spaced relation from said valve port, a resilient arm having one end attached to said plate and curved to extend about said power element and alongside said power element and terminating in a freely moving end adjacent to said port in spaced relation thereto, said arm engaging and following movement of said power element, means forming stiffening segments on said arm between said power element and said moving end, a valve member for closing said port, means to support said valve member on said arm comprising a resilient strip having one end connected to said valve member and the opposite end fixedly attached to said arm substantially inwardly from said moving end of said arm, said strip normally biased toward said arm, and a lost motion connection between said strip and arm.

2. A valve mechanism comprising, means forming a housing having an outlet port in a wall thereof, an arm structure supported by said housing and comprising a relatively rigid portion swingably attached at one end to said housing so that the other end of said relatively rigid portion is swingable with respect to said wall of said housing and adapted to swing toward and from said port, a valve closure member for closing said outlet port, means to attach said closure member to said relatively rigid portion of said arm structure and comprising a resilient member attached to said arm structure and carrying said closure member adjacent said other end of said arm structure, said relatively rigid portion of said resilient member yieldingly urging said closure member toward said relatively rigid portion of said arm structure but yielding to permit movement of said closure member to said port in response to a differential in pressure on opposite sides of said closure member, and a lost motion connection between said relatively rigid portion of said arm structure and closure member whereby relative movement between said closure member and said relatively rigid portion of said arm structure is limited.

3. A valve mechanism comprising means forming a housing having an outlet port therein, an arm structure supported by said housing and comprising a relatively rigid portion swingably attached at one end to said housing so that the other end of said relatively rigid portion is swingable with respect to said wall of said housing, a resilient strip attached at one end to said relatively rigid portion of said arm structure remote from said other end of said relatively rigid portion of said arm structure and extending along said relatively rigid portion of said arm structure on the side thereof toward said valve port, said strip being normally biased to relatively lightly yieldingly engage said relatively rigid portion of said arm structure at said opposite end, said strip having the end portion adjacent said other end of said relatively rigid portion of said arm structure turned laterally and extending transversely of said opposite end of said relatively rigid portion of said arm structure, said turned portion of said strip having a laterally projecting shoulder spaced from the plane of said strip proper and overlying and normally spaced from a part of said other end portion of said relatively rigid portion of said arm structure whereby said shoulder may be engaged by said part when said relatively rigid portion of said arm structure moves a limited distance from said strip, thereby providing a lost motion connection between said strip and said relatively rigid portion of said arm structure, and a valve closure member attached to said strip adjacent said one end thereof and positioned to close on said outlet port.

References Cited by the Examiner
UNITED STATES PATENTS

| | | | |
|---|---|---|---|
| 1,105,841 | 8/1914 | Ricketts et al. | 251—78 |
| 2,664,246 | 12/1953 | Ray | 251—75 |

M. CARY NELSON, *Primary Examiner.*

J. FENNELL, L. KAMPSCHROR, S. SCOTT,
*Assistant Examiners.*

UNITED STATES PATENT OFFICE
CERTIFICATE OF CORRECTION

Patent No. 3,251,573                                                            May 17, 1966

Marsden L. Miller et al.

It is hereby certified that error appears in the above numbered patent requiring correction and that the said Letters Patent should read as corrected below.

Column 5, line 3, strike out "relatively rigid portion of said" and insert the same before "arm structure" in same line 3, same column 5.

Signed and sealed this 24th day of October 1967.

(SEAL)
Attest:

Edward M. Fletcher, Jr.                                         EDWARD J. BRENNER Attesting Officer                                                         Commissioner of Patents